United States Patent Office 2,909,575
Patented Oct. 20, 1959

2,909,575

CHEMICAL PROCESS

Alfred Saffer, Bayside, and Ralph Landau, Roslyn Heights, N.Y., assignors to Mid-Century Corporation, Chicago, Ill., a corporation of Delaware No Drawing. Application October 22, 1958
Serial No. 768,859

23 Claims. (Cl. 260—671)

This invention relates to a process for the preparation of high purity 1,2,4,5-tetra-alkylbenzenes and more particularly, to a process for the preparation of high purity 1,2,4,5-dialkyl-diisopropylbenzene containing one to three carbon atoms in the alkyl groups wherein about 1.3 to 2.5 moles of an alkylating agent providing methyl, ethyl and isopropyl groups are reacted with 1 mol of diisopropylbenzene in the presence of an acid reacting Friedel-Crafts type alkylation catalyst, such as aluminum chloride to produce a reaction mixture containing substantially all or a major portion of the desired dialkyl-diisopropylbenzene together with diisopropylbenzenes and monoalkyl-diisopropylbenzenes and separating the desired dialkyl-diisopropylbenzene therefrom.

1,2,4,5-tetra-alkylbenzenes are commercially desirable materials especially as intermediates for the production of other chemicals, for example, such as pyro-mellitic acid (by conversion of each alkyl group to the corresponding carboxyl group). The art is confronted with the problem of providing tetra-alkylbenzene and especially the 1,2,4,5-diethyl-diisopropylbenzene, 1,2,4,5-dimethyl-diisopropylbenzene and 1,2,4,5-tetra-isopropylbenzene in a convenient and economic manner from readily available raw materials.

Various tetra-alkylbenzenes are known to be produced by alkylation procedures which give mixtures of various possible derivatives, many of which are difficult to separate by ordinary means.

The solution of the above mentioned problem, the discoveries associated with the present invention, and the objects achieved in accordance with the invention as described herein, include the following: the reaction of diisopropylbenzene with a methyl, ethyl or isopropyl group providing alkylating agent in the presence of aluminum chloride or other acid reacting Friedel-Crafts type alkylation catalysts using about 1.3 to 2.5 mols of said alkylating agent per mol of diisopropylbenzene, giving a reaction product containing a major portion of 1,2,4,5-dialkyl-diisopropylbenzene, separation of the latter and recycling the other components to the alkylation step, the desired 1,2,4,5-dialkyl-diisopropylbenzene being substantially the only product removed from the system, and in the preferred operation using approximately 1.6 to 2.1 mols of said alkylating agent per mol of diisopropylbenzene; and other objects which will be apparent as details or embodiments of the invention are set forth hereinafter.

In order to facilitate a clear understanding of the invention the following preferred specific embodiments are described in detail.

Example 1

Into a suitable reactor having a corrosion resistant inner surface (e.g., glass, ceramic or corrosion resistant metal or alloy), equipped with agitating means such as a gas or mechanical device, and with a means for heating or cooling the contents thereof such as a coil or jacket, a reflux condenser, a gas inlet tube, and optionally a vent for passing off low boiling materials, there are charged:

50 parts by weight of aluminum chloride
1000 parts para-diisopropylbenzene
25 parts of anhydrous HCl (added gradually); then
270 parts ethylene (e.g., as 95% ethylene gas)

is absorbed therein over a period of about 1¾ hours, with agitation, while the temperature is maintained in the range of about 70–80° C., e.g., about 75° C. The temperature is maintained by cooling or heating as is required.

When absorption of the indicated amount of ethylene is completed the catalyst complex is separated from the reaction mixture and the residue is washed with about an equal volume of 10% aqueous caustic solution. This is followed by washing with an equal volume of water. Any hydrocarbon phase is separated from the wash residue and combined with the reaction product for distillation.

The reaction product is purified by distillation, there being obtained as a forerun small quantities of diisopropylbenzene and ethyl-diisopropylbenzene. The major portion of the distillate is the desired product 1,2,4,5-diethyl-diisopropylbenzene boiling at 255–259° C. at 760 mm. Hg.

Example 2

Into a suitable reactor having a corrosion resistant inner surface (e.g., glass, ceramic or corrosion resistant metal or alloy), equipped with agitating means such as a gas or mechanical device, and with a means for heating or cooling the contents thereof such as a coil or jacket, a reflux condenser, a gas inlet tube, and optionally a vent for passing off low boiling materials, there are charged:

90 parts by weight of aluminum chloride
1000 parts para-diisopropylbenzene
25 parts of anhydrous HCl (added gradually); then
500 parts methyl chloride is added over a period of about 1.75 hours, with agitation, while the temperature is maintained in the range of about 85–95° C., e.g., about 90° C. The temperature is maintained by cooling or heating as is required.

When addition of the indicated amount of methyl chloride is completed the catalyst complex is separated from the reaction mixture and the residue is washed with about an equal volume of 10% aqueous caustic solution. This is followed by washing with an equal volume of water. Any hydrocarbon phase is separated from the wash residue and combined with the reaction product for distillation.

The reaction product is purified by distillation, there being obtained as a forerun small quantities of diisopropylbenzene and methyl-diisopropylbenzene. The major portion of the distillate is the desired product 1,2,4,5-dimethyl-diisopropylbenzene boiling in the range of 200–211° C. at 760 mm. Hg.

Example 3

Into a suitable reactor having a corrosion resistant inner surface (e.g., glass, ceramic or corrosion resistant metal or alloy), equipped with agitating means such as a gas or mechanical device, and with a means for heating or cooling the contents thereof such as a coil or jacket, a reflux condenser, a gas inlet tube, and optionally a vent for passing off low boiling materials, there are charged:

25 parts by weight of aluminum chloride
1000 parts para-diisopropylbenzene
12.5 parts of anhydrous HCl (added gradually); then
460 parts propylene (e.g., as 95% propylene gas)

is absorbed therein over a period of about 1¾ hours, with agitation, while the temperature is maintained in the range of about 20–30° C., e.g., about 25° C. The temperature is maintained by cooling or heating as is required.

During the absorption of propylene formation of a solid is noted. As the reaction approaches completion the reaction mixture becomes a thick slurry and increased agitation is required to effect intimate contact between the remaining diisopropylbenzene and the propylene.

When absorption of the indicated amount of propylene is completed the catalyst complex is separated from the reaction mixture and the residue is washed with about an equal volume of 10% aqueous caustic solution. This is followed by washing with an equal volume of water. Any hydrocarbon phase is separated from the wash residue and combined with the reaction product for distillation.

The reaction product is purified by distillation, there being obtained as a forerun small quantities of di- and tri-isopropylbenzenes and on occasion, minimum quantities of propylene polymer. The major portion of the distillate is the desired product 1,2,4,5-tetra-isopropylbenzene which is recrystallized from benzene. There is obtained 1,2,4,5-tetra-isopropylbenzene having a melting point of 117–118° C.

The process of this invention may be conducted continuously, and this method is especially desirable for commercial operation. The reactor may be charged continuously with the recycled catalyst phase plus the make-up aluminum chloride and additional hydrogen chloride as required. Diisopropylbenzene and the alkylating agent providing methyl, ethyl or isopropyl groups are charged continuously thereto in required proportions and a part of the reaction mixture is continuously removed from the reactor, the catalyst being recycled to the reactor and the hydrocarbon components of the reaction mixture are washed with aqueous caustic and then water and separated in a fractionating system wherein the light ends are taken off and recycled, preferably after drying. The main distillate is the desired 1,2,4,5-dialkyl-diisopropylbenzene product.

The invention is associated with the surprising discovery that the mixture from the reactor may contain up to approximately 90% by weight of 1,2,4,5-dialkyl-diisopropylbenzene. This yield is closely approached or obtained for practical purposes if the ratio of "methyl, ethyl or isopropyl group providing reactant" (herein used to mean the alkylating agent, for example methyl chloride, ethylene or propylene plus equivalent methyl ethyl or isopropyl groups attached to the benzene ring in any recycled material) to total benzene nuclei is in the range of about 3.6 to 4.1 on a mol basis. A somewhat wider range, for example, 3.5 to 4.5 mols of methyl ethyl or isopropyl group reactant per mol of benzene nucleus gives good results. Excellent results are obtained operating in the range of 3.5 to 4.3.

In place of the methyl chloride utilized in Example 2 there can be utilized equal molar quantities of known methylating agents. It is preferred to utilize as the methylating agents methyl halides, methyl chloride being the methylating agent of choice.

Readily available propylene stocks may be used, preferably free of other unsaturates. The reactor system may be provided with vents to pass off lower boiling hydrocarbons which do not react therein.

The diisopropylbenzene feedstock should be free of aromatics and may contain some paraffins which may be separated out of the system. Comparable results to the foregoing are obtained with various modifications. For example, the starting material may be a mixture of meta- and para-diisopropylbenzenes or either of the individual isomers. The hydrocarbon reaction catalyst may be a Friedel-Crafts type acid reacting alkylation catalyst, such as hydrogen fluoride, boron trifluoride and the like.

The amount of alkylation catalyst employed in the preparation of dialkyl-diisopropylbenzenes according to the process of this invention can be varied over a substantial range. However, with each alkylating agent there is associated a slightly different range of alkylation catalyst which will produce suitable results. For example, when a methylating agent is employed, desirable results are obtained using from 0.5 to 5% catalyst, excellent results are obtained using from 1.0 to 4% catalyst and the preferred amount of catalyst is from 2 to 3%. With an ethylating agent, desirable results are obtained with 2 to 15% catalyst, excellent results with 4 to 10% and the preferred amount of catalyst is 5 to 6%. When an isopropyl group providing alkylating agent is employed, desirable results are obtained with 3 to 20% catalyst, excellent results with 6 to 12% and the preferred amount of catalyst is 8 to 10%. All amounts of catalyst expressed as percentage are percent by weight based on the diisopropylbenzene undergoing alkylation.

Likewise the alkylation temperature varies somewhat with the alkylating agent. When diisopropylbenzene is methylated to its dimethyl derivative, useful temperatures are in the range of 40 to 120° C., desirable temperatures are in the range of 70 to 100° C. and preferred temperatures when aluminum chloride is employed as the catalyst are in the range of from 80 to 100° C. When the diethyl derivative of diisopropylbenzene is to be prepared, useful alkylation temperatures are in the range of from 20 to 110° C., desirable temperatures are in the range of from 40 to 100° C. and, when aluminum chloride is the catalyst, the preferred temperatures are in the range of 50 to 90° C. The useful alkylation temperatures associated with the preparation of tetra-isopropylbenzene are in the range of from −50 to 50° C., desirable temperatures are in the range of from 0 to 40° C. and with aluminum chloride as the catalyst the preferred temperatures are in the range of from 20 to 30° C.

The reaction time broadly may be from about 0.5 to 50 hours. Excellent results are obtained in the range of from 1 to 5 hours and it is preferred to utilize reaction times of from 1 to 2 hours.

As mentioned above, formation of product gives rise to handling problems of the slurry formed during reaction. In one embodiment of the present invention there is utilized a solvent which is inert to alkylation. For example, the nitro paraffins, exemplified as nitro-methane and nitroethane, can be utilized. In general, the solvent utilized should be characterized by inertness to alkylation and should differ in its boiling point from that of the desired 1,2,4,5-tetra-isopropylbenzene product by about 20°. This enables separation of the solvent from the product, the solvent being recycled to the reactor. It is, of course, desirable to utilize as small amount of solvent as is possible since the solvent must be separated from the desired product. The amount of solvent utilized, therefore, depends upon the particular equipment in which the reaction is being carried out. Satisfactory results are obtained utilizing approximately one volume of solvent per volume of diisopropylbenzene reactant although, in some instances, a lesser volume can be used.

A highly desirable feature of the process of this invention is that the methylation, ethylation and isopropylation of diisopropylbenzene to its dimethyl and diethyl derivatives and tetra-isopropyl derivative are accomplished in substantially theoretical yields without obtaining economically undesirable amounts of by-products. From the economic viewpoint, it is highly desirable inasmuch as the commercial utility of the process is directly related substantially to the 1,2,4,5-dialkyl-diisopropylbenzene.

In view of the foregoing discussions, variations and

This application is a continuation-in-part of our applications Serial Nos. 590,353, 590,354 and 590,384, each filed June 11, 1956, and now abandoned.

We claim:

1. A process for the preparation of 1,2,4,5-dialkyl-diisopropylbenzenes wherein the alkyl groups contain 1 to 3 carbon atoms which comprises reacting 1.3 to 2.5 mols of an alkyl group providing reactant containing 1 to 3 carbon atoms with one mol of a diisopropylbenzene chosen from the class consisting of meta- and para-diisopropylbenzene in the presence of an acid reacting Friedel-Crafts type alkylation catalyst at a temperature set out in the schedule herein to produce a reaction mixture containing a preponderance of said 1,2,4,5-dialkyl-diisopropylbenzene, and separating said 1,2,4,5-dialkyl-diisopropylbenzene therefrom, wherein the relationship between the alkyl group providing reactant, as expressed by the type of alkyl group present on said 1,2,4,5-dialkyl-diisopropylbenzene, and the temperature for each alkyl group providing reactant is set out in the annexed schedule:

| Alkyl group providing reactant | Temperature, ° C. |
|---|---|
| Methyl | 40 to 120 |
| Ethyl | 20 to 110 |
| Isopropyl | −50 to 50 |

2. A process for the preparation of 1,2,4,5-dimethyl-diisopropylbenzene which comprises reacting at a temperature of from 40 to 120° C. about 1.3 to 2.5 mols of methylating agent with one mol of diisopropylbenzene in the presenec of an acid reacting Friedel-Crafts type alkylation catalyst to produce a reaction mixture containing a preponderance of 1,2,4,5-dimethyl-diisopropylbenzene, and separating the 1,2,4,5-dimethyl-diisopropylbenzene therefrom.

3. A process of claim 2 wherein the diisopropylbenzene is para-diisopropylbenzene.

4. A process of claim 2 wherein the diisopropylbenzene is meta-diisopropylbenzene.

5. A process of claim 2 wherein the residue after separation of the 1,2,4,5-dimethyl-diisopropylbenzene is recycled to the alkylation step.

6. A process of claim 2 wherein the catalyst is aluminum chloride.

7. A process of claim 2 wherein the catalyst is boron trifluoride.

8. A process of claim 2 wherein the catalyst is hydrogen fluoride.

9. A process for the preparation of 1,2,4,5-diethyl-diisopropylbenzene which comprises reacting at a temperature of from 20 to 110° C. about 1.3 to 2.5 mols of ethyl group reactant with one mol of a diisopropylbenzene chosen from the class consisting of meta- and para-diisopropylbenzene in the presence of an acid reacting Friedel-Crafts type alkylation catalyst to produce a reaction mixture containing a preponderance of 1,2,4,5-diethyl-diisopropylbenzene, and separating the 1,2,4,5-diethyl-diisopropylbenzene therefrom.

10. A process of claim 9 wherein the diisopropylbenzene is para-diisopropylbenzene.

11. A process of claim 9 wherein the diisopropylbenzene is meta-diisopropylbenzene.

12. A process of claim 9 wherein the residue after separation of the 1,2,4,5-diethyl-diisopropylbenzene is recycled to the alkylation step.

13. A process of claim 9 wherein the catalyst is aluminum chloride.

14. A process of claim 9 wherein the catalyst is boron trifluoride.

15. A process of claim 9 wherein the catalyst is hydrogen fluoride.

16. A process for the preparation of 1,2,4,5-tetra-isopropylbenzene which comprises contacting at a temperature of from −50 to 50° C. about 1.3 to 2.5 mols of propyl group reactant with one mole of diisopropylbenzene in the presence of an acid reacting Friedel-Crafts type alkylation catalyst to produce a reaction mixture containing a preponderance of 1,2,4,5-tetra-isopropylbenzene, and separating the 1,2,4,5-tetra-isopropylbenzene therefrom.

17. A process of claim 16 wherein the diisopropylbenzene is para-diisopropylbenzene.

18. A process of claim 16 wherein the diisopropylbenzene is meta-diisopropylbenzene.

19. A process of claim 16 wherein the diisopropylbenzene is ortho-diisopropylbenzene.

20. A process of claim 16 wherein the residue after separation of the 1,2,4,5-tetra-isopropylbenzene is recycled to the alkylation step.

21. A process of claim 16 wherein the catalyst is aluminum chloride.

22. A process of claim 16 wherein the catalyst is boron-trifluoride.

23. A process of claim 16 wherein the catalyst is hydrogen fluoride.

References Cited in the file of this patent

UNITED STATES PATENTS 2,744,150  Enos _____ May 1, 1956

OTHER REFERENCES

Berry et al.: Jour. Amer. Chem. Soc., vol. 49, 1927, pp. 3142–3149.

Ipatieff et al.: Jour. Amer. Chem. Soc., vol. 58, 1936, pp. 919–922.

Calcott et al.: Jour. Amer. Chem. Soc., vol. 61, 1939, pp. 1010–1015.

Nightingale: Chemical Reviews, vol. 25, 1939, p. 341.